United States Patent
Wang et al.

(10) Patent No.: US 11,377,112 B2
(45) Date of Patent: Jul. 5, 2022

(54) LOW-SPEED, BACKWARD DRIVING VEHICLE CONTROLLER DESIGN

(71) Applicant: Baidu USA LLC, Sunnyvale, CA (US)

(72) Inventors: Yu Wang, Sunnyvale, CA (US); Qi Luo, Sunnyvale, CA (US); Shu Jiang, Sunnyvale, CA (US); Jinghao Miao, Sunnyvale, CA (US); Jiangtao Hu, Sunnyvale, CA (US); Jingao Wang, Sunnyvale, CA (US); Jinyun Zhou, Sunnyvale, CA (US); Runxin He, Sunnyvale, CA (US); Jiaxuan Xu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 147 days.

(21) Appl. No.: 16/682,445

(22) Filed: Nov. 13, 2019

(65) Prior Publication Data

US 2021/0139038 A1 May 13, 2021

(51) Int. Cl.
*B60W 50/00* (2006.01)
*G05D 1/00* (2006.01)
*B60W 30/18* (2012.01)

(52) U.S. Cl.
CPC ............ *B60W 50/00* (2013.01); *B60W 30/18* (2013.01); *G05D 1/0088* (2013.01);
(Continued)

(58) Field of Classification Search
CPC .. B60W 50/00; B60W 30/18; B60W 2556/00; B60W 2050/0028; B60W 2050/0008; G05D 1/0088
See application file for complete search history.

(56) References Cited

U.S. PATENT DOCUMENTS

| 2016/0107682 | A1* | 4/2016 | Tan ...................... G05D 1/0212 701/41 |
| 2017/0233001 | A1* | 8/2017 | Moshchuk ............... B62D 1/28 701/42 |

(Continued)

FOREIGN PATENT DOCUMENTS

WO   WO-2020050278 A1 *   3/2020   ........... G01S 13/584

*Primary Examiner* — Hunter B Lonsberry
*Assistant Examiner* — Jimin You
(74) *Attorney, Agent, or Firm* — Womble Bond Dickinson (US) LLP

(57) ABSTRACT

Generating control effort to control an autonomous driving vehicle (ADV) includes determining a direction (forward or reverse) in which the ADV is driving and selecting a driving model and a predictive model based upon the direction. In a forward direction, the driving model is a dynamic model, such as a "bicycle model," and the predictive model is a look-ahead model. In a reverse direction, the driving model is a hybrid dynamic and kinematic model and the predictive model is a look-back model. Current and predicted lateral error and heading error are determined using the driving model and predictive model, respectively. A linear quadratic regulator (LQR) uses the current and predicted lateral error and heading errors to determine a first control effort An augmented control logic determines a second, additional, control effort, to determine a final control effort that is output to a control module to drive the ADV.

21 Claims, 10 Drawing Sheets

(52) U.S. Cl.
CPC .............. *B60W 2050/0008* (2013.01); *B60W 2050/0028* (2013.01); *B60W 2556/00* (2020.02)

(56) References Cited

U.S. PATENT DOCUMENTS

| | | | | |
|---|---|---|---|---|
| 2018/0141540 A1* | 5/2018 | Kumazaki | ............... | F16H 63/50 |
| 2018/0321682 A1* | 11/2018 | Matsumoto | ............. | G01S 19/14 |
| 2019/0250607 A1* | 8/2019 | Sadakiyo | .............. | B60W 30/18 |
| 2020/0114968 A1* | 4/2020 | Xu | ........................ | B60D 1/245 |
| 2020/0410853 A1* | 12/2020 | Akella | .............. | B60W 30/0956 |

\* cited by examiner

LOW-SPEED, BACKWARD DRIVING VEHICLE CONTROLLER DESIGN

TECHNICAL FIELD

Embodiments of the present disclosure relate generally to operating autonomous vehicles. More specifically, the present disclosure is related to determining a more efficient and more accurate control effort for controlling the ADV when controlling the ADV in either forward or reverse driving direction, and in low speed environments.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Certain driving scenarios, such as low speed driving that require driving in reverse, are very difficult to model. Forward driving often uses the "bicycle model" as a dynamic model for driving forward over a wide variety of speeds. Some prior art solutions to modeling driving in reverse use a forward dynamic model and simply reverse the sign and/or orientation of algorithms and obstacles to the ADV. However, as is well-known to human drivers, the dynamics of any vehicle are different in reverse than in forward driving due, in part, to imperfect center of mass of the vehicle, whether the steering wheels are in front or the rear of the vehicle, whether the driving wheels are in front or the rear of the vehicle, the location of the engine, camber and caster of the steering wheels at the limits of the vehicle's turning radius, state of the tread wear and alignment of the steering wheels, and the like.

These dynamics are often more pronounced in slow speed driving. Slow speed driving is typically used for open-space driving scenarios such as autonomous parking in a parking lot, 3-point turns, U-turns, and other low-speed, tight turning radius driving scenarios. These tight turning scenarios frequently require that the vehicle turn to its maximum turning angle, which adversely affects the friction force offered by the wheels and tires of the vehicle. For at least these reasons, conventional autonomous driving dynamic models do not provide sufficient control accuracy for open-space driving scenarios that require tight turning and both forward and reverse driving at low speeds.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to a first aspect, a method of controlling an autonomous driving vehicle (ADV) using a model-switching method includes determining a gear position of the ADV. The gear position can be a forward driving gear position or a reverse driving gear position. A driving model and a predictive feedback model are selected, based upon the gear position. In the forward driving gear position, the driving model can be a dynamic model, such as the "bicycle" model or other dynamic model, and the predictive feedback model can be a look-ahead model. In the reverse driving gear position, the driving model can be a hybrid dynamic and kinematic model, described herein, and the predictive feedback model can be a "look-back" model. Using the selected driving model, a current lateral error and current heading error of the ADV are determined. Using the selected predictive feedback model, a predicted lateral error and predicted heading error of the ADV are determined. The current and predicted lateral errors and heading errors can be provided to a linear quadratic regulator (LQR) to produce a first control effort, based on the current and predicted lateral errors and heading errors. In an embodiment, an augmented control effort, based on a Fourier Transform analysis, in the frequency domain, of a lateral and/or heading error signal of the ADV, can be added to the LQR control effort output to produce a final control effort sent to a control module of the ADV to control the ADV driving.

In an embodiment, any/all of the above method functionality can be implemented by a processing system, comprising one or more hardware processors coupled to a memory programmed with executable instructions that, when executed by the processing system, cause a computing system to implement the claimed functionality. In an embodiment, the memory can be a non-transitory computer-readable medium or other type of memory.

Figure 1:
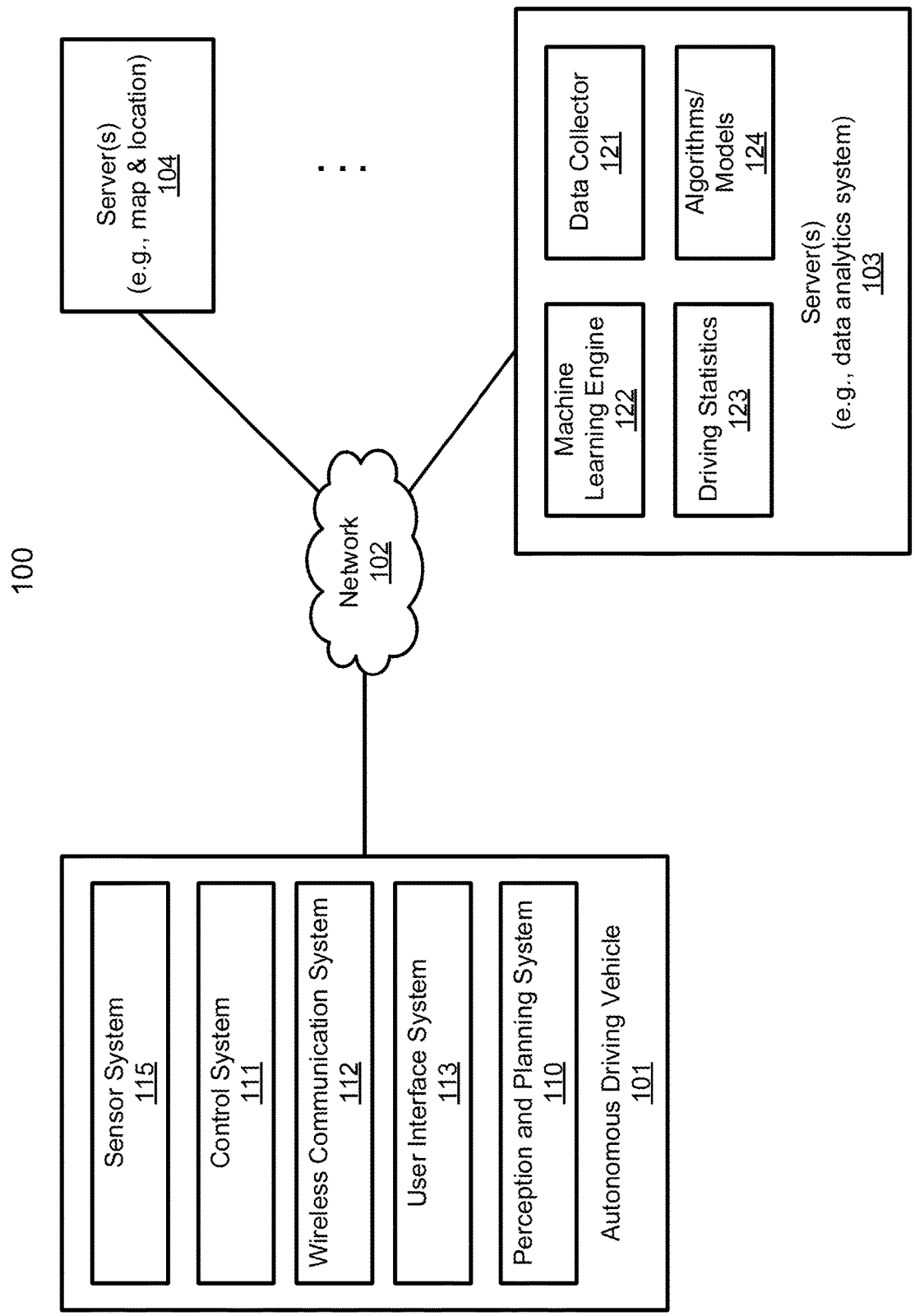
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
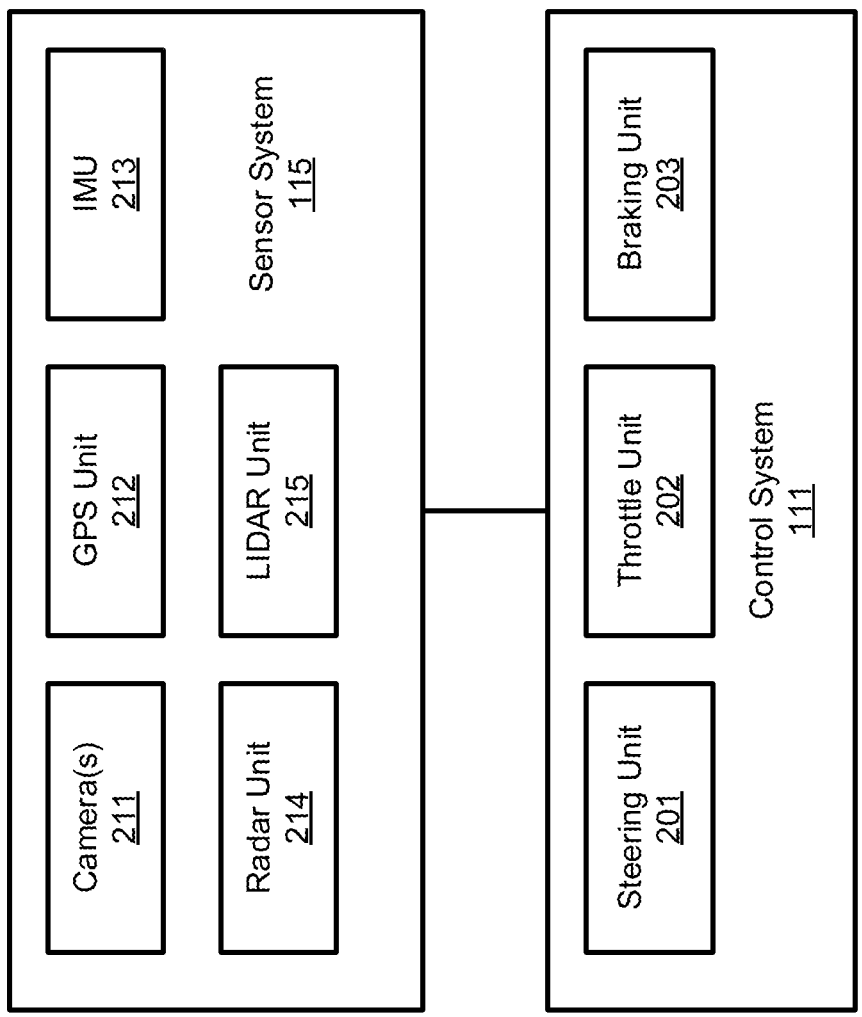
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include forward driving models, reverse driving models, look-ahead predictive feedback models, linear quadratic regulators, and augmented control models as described below with respect to FIG. 3C.

Algorithms 124 can then be uploaded on ADVs to be utilized during autonomous driving in real-time.

Figure 3A:
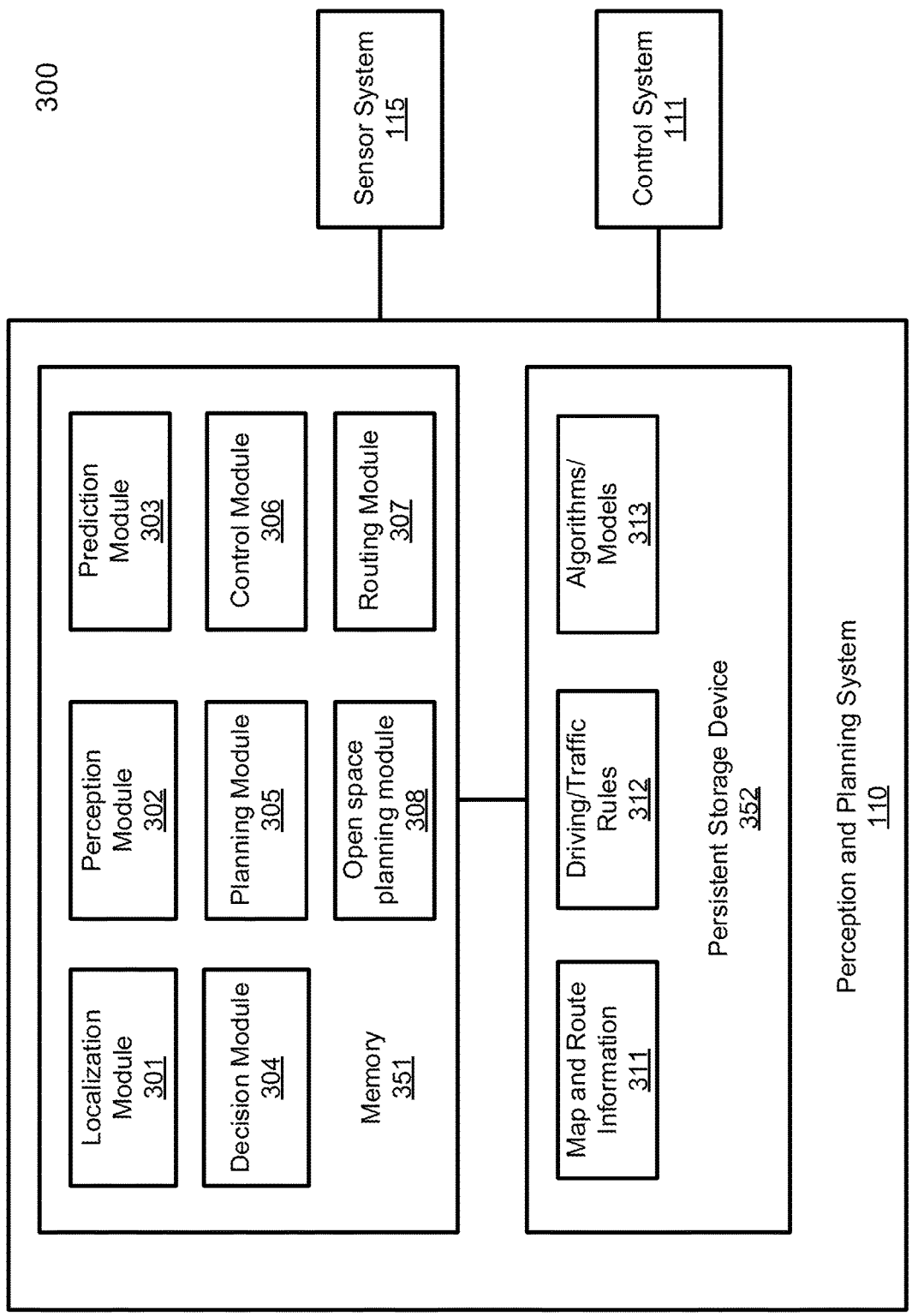
FIGS. 3A-3B are block diagrams illustrating an example of a perception and planning system used with an autonomous vehicle according to one embodiment.
Figure 3B:
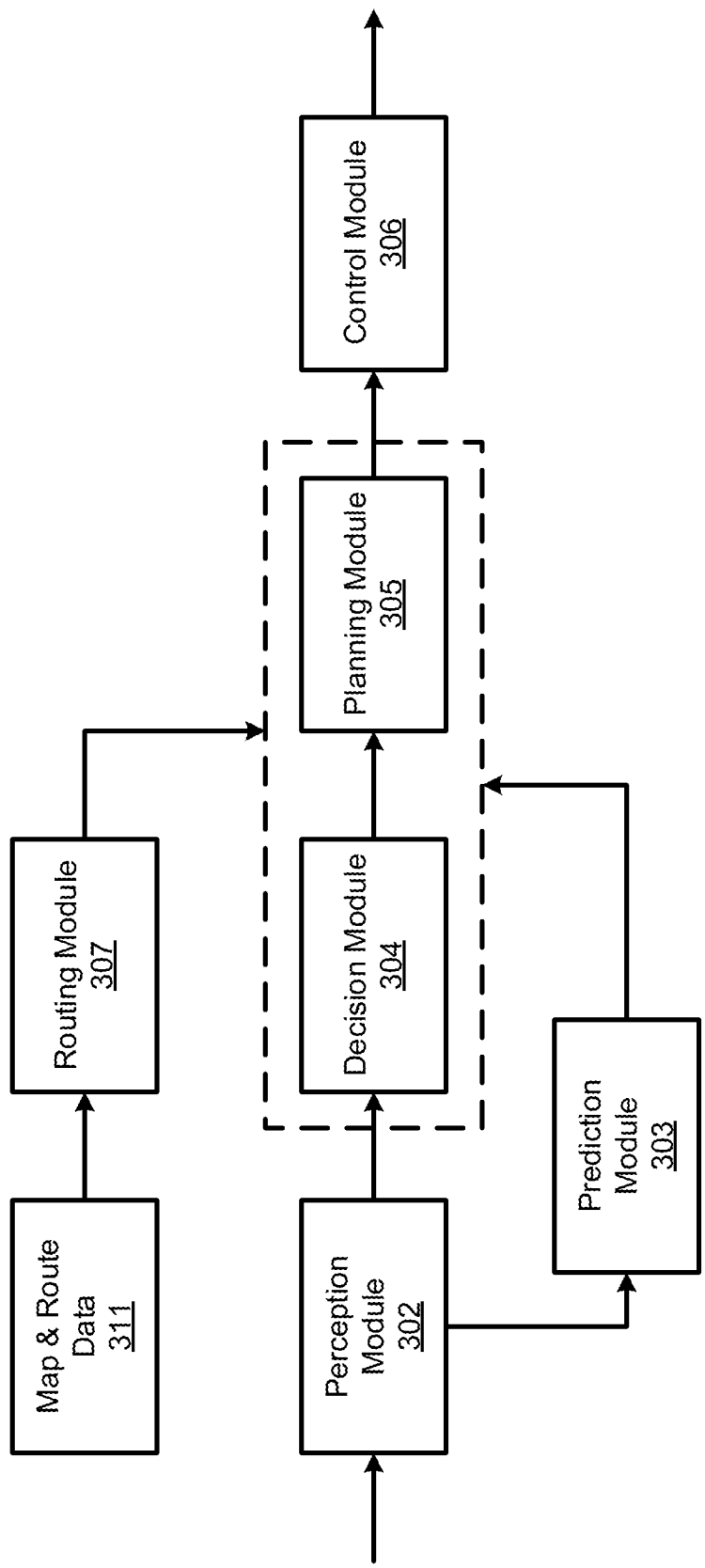
Figure 3C:
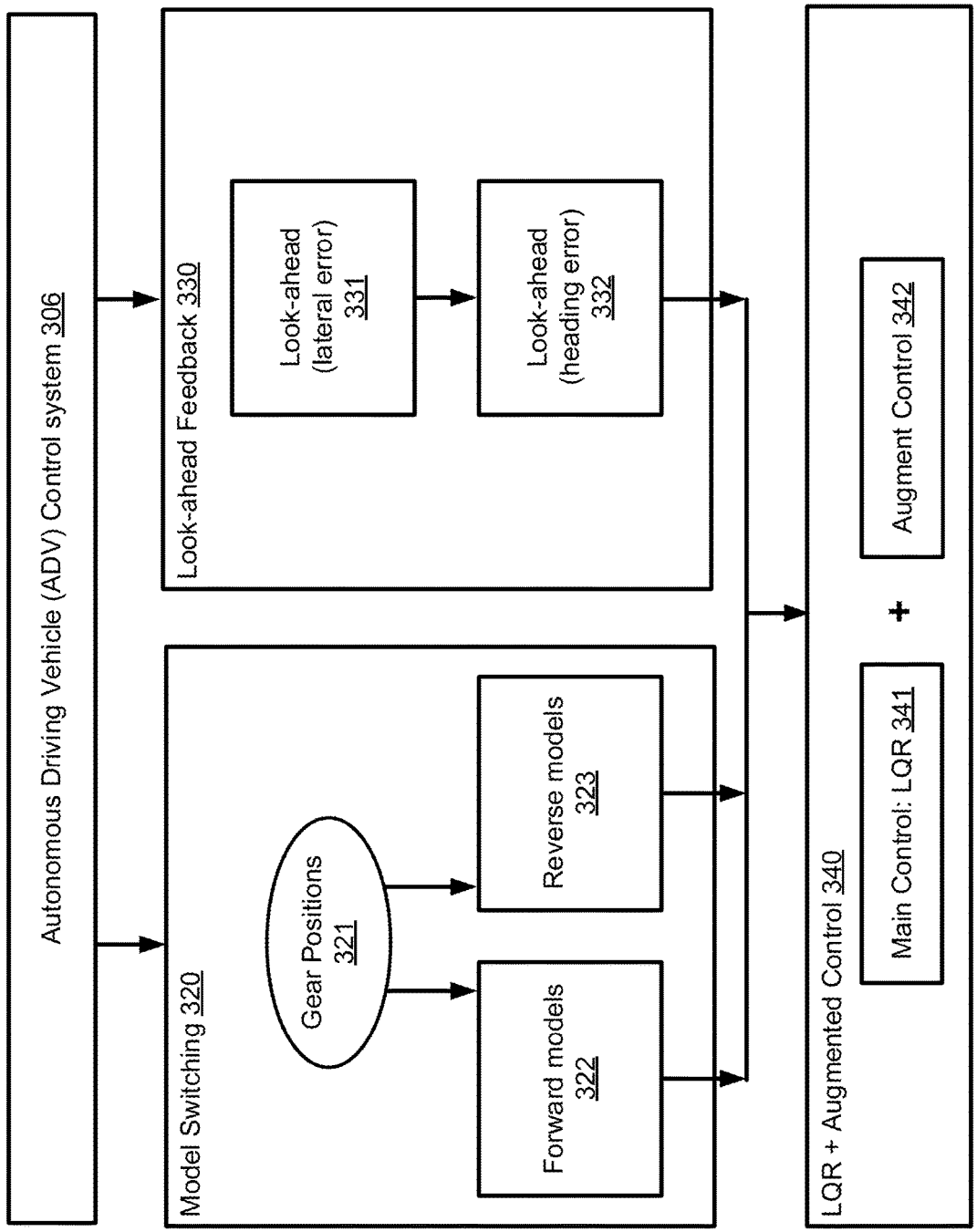

FIGS. 3A through 3C are block diagrams illustrating an example of a perception and planning system used with an autonomous vehicle, according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, a routing module 307, and an open space planning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. Control module 306 can include logic for open-space, low-speed controls for both forward and reverse driving wherein additional control may be needed to increase accuracy for open-space, low-speed, and reverse driving scenarios, such as U-turns, 3-point turns, parking in tight-spaces such as parking in a parking lot. The additional logic is described in detail with respect to FIG. 3C, below. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Open space planning module 308 is described below with reference to FIG. 4. Another aspect of the open space planning module 308 is described below with reference to FIG. 7. Open space planning module 308 may be implemented as a part of planning module 305.

Referring now to FIG. 3C, additional logic for controlling the ADV in special driving scenarios is described. Special driving scenarios can include performing a U-turn, a 3-point turn, parking in a parking lot, or other driving that may require low speed (e.g. less than 10 miles per hour), sharp turns at, or near, the maximum turning angle for the vehicle, and driving in both forward in reverse. Control system 306 can include a driving model switching module 320, a look-ahead feedback module and a linear quadratic regulator (LQR) and augmented control module 340.

Control module 306, described above with reference to FIGS. 2, 3A, and 3B, can produce outputs that are received and processed by both the model switching module 320 and the look-ahead feedback module 330. Model switching 320 can include logic 321 to detect a gear position of the ADV. A gear position can include a forward driving gear and a reverse driving gear. In an embodiment, gear position detection logic 321 can receive an indication of one or more different forward driving gears, e.g. "$1^{st}$, $2^{nd}$ . . . etc.," and determine that each of these gears is a forward driving gear. Based upon the determination that a gear is a forward driving gear or a reverse driving gear, model switching module 320 can select a forward driving model 322 or a reverse driving model 323 for determining a current lateral error and heading error of the ADV. Look-ahead feedback module 330 contains logic to output a predicted lateral error and heading error based on a predictive "look-head" model for lateral error 331 and a predictive look-ahead model for heading error 332. Both of the predictive models 331 (lateral error) and 332 (heading error) can each produce error outputs for a forward gear driving and reverse gear driving by changing a sign of each predictive model 331 or 332 output. As described herein, the output of a predicted lateral error and heading error is based upon the determined driving gear position to distinguish between "look-ahead" prediction when a forward driving gear is selected and "look-back" prediction when a reverse driving gear is selected. A forward driving model 322 and a reverse driving model 323 are described below.

A forward driving model 322 can be a $4^{th}$ order dynamic model, such as the following:

$$\begin{bmatrix} \dot{e}_1 \\ \ddot{e}_1 \\ \dot{e}_2 \\ \ddot{e}_2 \end{bmatrix} =$$

$$\begin{bmatrix} 0 & 1 & 0 & 0 \\ 0 & \frac{-2C_{af} - 2C_{ar}}{mV_x} & \frac{2C_{af} + 2C_{ar}}{m} & \frac{-2C_{af}l_f + 2C_{ar}l_r}{mV_x} \\ 0 & 0 & 0 & 1 \\ 0 & \frac{-2C_{af}l_f + 2C_{ar}l_r}{I_zV_x} & \frac{2C_{af}l_f - 2C_{ar}l_r}{I_z} & \frac{-2C_{af}l_f^2 - 2C_{ar}l_r^2}{I_zV_x} \end{bmatrix} \begin{bmatrix} e_1 \\ \dot{e}_1 \\ e_2 \\ \dot{e}_2 \end{bmatrix} +$$

$$B_1\delta + B_2\dot{\psi}_{des}$$

wherein:

$$B_1 = \begin{bmatrix} 0 & \frac{2C_{af}}{m} & 0 & \frac{2C_{af}l_f}{I_Z} \end{bmatrix}^T \quad (1)$$

$$B_2 = \begin{bmatrix} 0 & \frac{-2C_{af}l_f + 2C_{ar}l_r}{mV_x} - V_x & 0 & \frac{-2C_{af}l_f^2 - 2C_{ar}l_r^2}{I_ZV_x} \end{bmatrix}^T \quad (2)$$

(3) $e_1$ is the distance of the center of gravity of the autonomous driving vehicle (ADV) from the center trajectory line, and in the reverse model, this is stricken out, $\dot{e}_1$ and $\ddot{e}_1$ are first and second derivatives of $e_1$, (4) $e_2$ is the orientation error of the vehicle with respect to the lane (in radians), $\dot{e}_2$ and $\ddot{e}_2$ are first and second derivatives of $e_2$, (5) $\delta$ is the steering angle of the ADV (in radians), (6) $\dot{\psi}_{des}$ is the desired yaw rate (orientation error rate) from road radius R, (7) m is the mass of the ADV (e.g. 1500 kg), (8) $V_x$ is the longitudinal velocity of the ADV, $V_y$ is the lateral velocity of the ADV (e.g. in meters per second: m/s), (9) $I_z$ is the yaw moment of inertia (e.g. 2900 kgm$^2$),

(10) $l_f$ and $l_r$ are the distances between the center of gravity of the ADV and the front and rear wheels, respectively (e.g. 1.1 and 1.6 meters), and

(11) $C_{af}$ and $C_{ar}$ are the friction force of the front and rear wheels, respectively (e.g. $C_{af}=C_{ar}$=40000 N/rad).

A reverse driving model 323 can be a $3^{rd}$ order hybrid driving model, wherein a portion of the $4^{th}$ order dynamic model, described above, is replaced with a kinematic model. The portion of the dynamic model that is replaced can be computed and discarded, or constants can replace the computations in the dynamic model that would otherwise be discarded.

$$\begin{bmatrix} \dot{e}_1 \\ \ddot{e}_1 \\ \dot{e}_2 \\ \ddot{e}_2 \end{bmatrix} = \begin{bmatrix} 0 & 0 & V_x & 0 \\ 0 & \frac{-2C_{af} + 2C_{ar}}{mV_x} & \frac{-2C_{af} - 2C_{ar}}{m} & \frac{2C_{af}l_f - 2C_{ar}l_r}{mV_x} \\ 0 & 0 & 0 & 1 \\ 0 & \frac{2C_{af}l_f - 2C_{ar}l_r}{I_zV_x} & \frac{-2C_{af}l_f + 2C_{ar}l_r}{I_z} & \frac{2C_{af}l_f^2 + 2C_{ar}l_f^2}{I_zV_x} \end{bmatrix} \begin{bmatrix} e_1 \\ \dot{e}_1 \\ e_2 \\ \dot{e}_2 \end{bmatrix} + B_1\delta + B_2\dot{\psi}_{des}$$

wherein the crossed-out portion of the equivalent dynamic model is either not computed, or is discarded if computed, or is replaced with appropriate constants, and wherein:

$$B_1 = \begin{bmatrix} 0 & \frac{2C_{af}}{m} & 0 & \frac{2C_{af}l_f}{I_Z} \end{bmatrix}^T \quad (1)$$

$$B_2 = \begin{bmatrix} 0 & \frac{-2C_{af}l_f + 2C_{ar}l_r}{mV_x} - V_x & 0 & \frac{-2C_{af}l_f^2 - 2C_{ar}l_r^2}{I_ZV_x} \end{bmatrix}^T \quad (2)$$

(3) $e_1$ is the distance of the center of gravity of the autonomous driving vehicle (ADV) from the center trajectory line, and in the reverse model, this is stricken out, $\dot{e}_1$ and $\ddot{e}_1$ are first and second derivatives of $e_1$, (4) $e_2$ is the orientation error of the vehicle with respect to the lane (in radians), $\dot{e}_2$ and $\ddot{e}_2$ are first and second derivatives of $e_2$, (5) $\delta$ is the steering angle of the ADV (in radians), (6) $\dot{\psi}_{des}$ is the desired yaw rate (orientation error rate) from road radius R, (7) m is the mass of the ADV (e.g. 1500 kg), (8) $V_x$ is the longitudinal velocity of the ADV, $V_y$ is the lateral velocity of the ADV (e.g. in meters per second: m/s), (9) $I_z$ is the yaw moment of inertia (e.g. 2900 kgm$^2$), measured at the center of mass of the ADV,

(10) $l_f$ and $l_r$ are the distances between the center of mass of the ADV and the front and rear wheels, respectively (e.g. 1.1 and 1.6 meters), and

(11) $C_{af}$ and $C_{ar}$ are friction forces of the front and rear wheels, respectively (e.g. $C_{af}=C_{ar}$=40000 N/rad).

Look-ahead predictive feedback module 323 can include the following lateral and heading error calculations.

When the ADV is in a forward driving gear, the look-ahead predicted lateral error 323, $pe_1$ at time i+1, is given by: $pe_1=f(e_1, e_2, d_s)$, wherein $e_1$ is the lateral error of the ADV at current time i, ds is a predicted distance that the ADV will have traveled by a predicted future time i+1, based on the current longitudinal speed $v_x$, and $e_2$ is the heading error of the ADV at time i. In an embodiment, $f=e_1+d_s*e_2$. In an embodiment, the predicted lateral error $pe_1$ may be scaled by a tuning constant. Predicted heading error at time i+1, is given by: $pe_2=g(e_1, e_2, d_s, v_x, \theta_{des})$ wherein $e_2$ is the current heading error at time i, $d_s$ is the predicted distance traveled by the ADV at time i+1, $v_x$ is the current speed of the ADV, and $\theta_{des}$ is the maximum design steering angle of the ADV.

When the ADV is in a reverse driving gear, the look-back predicted lateral error 323, $pe_1$, at time i+1, is given by: $pe_1 = f(e_1, e_2, -d_s)$, wherein $e_1$ is a the lateral error of the ADV at current time i, ds is a predicted distance that the ADV will have traveled by a predicted future time i+1, based on the current longitudinal speed $-v_x$, and $e_2$ is the heading error of the ADV at time i. In an embodiment, the predicted lateral error $pe_1$ may be scaled by a tuning constant. Predicted heading error at time i+1, is given by: $pe_2=(e_1, e_2, -d_s, -v_x, \theta_{des})$ wherein $e_2$ is the current heading error at time i, $-d_s$ is the predicted distance traveled by the ADV at time i+1, $v_x$ is the current speed of the ADV, and $\theta_{des}$ is the maximum design steering angle of the ADV.

The current lateral and heading error output by model switching 320, and the predicted lateral and heading error output by look-ahead/look-back feedback module 330, are passed to LQR+Augmented Control module 340. LQR+Augmented Control module 340 includes a main control: LQR 341 and an augmented control module 342. Each of the LQR module 341 and Augmented Control module 342 outputs control effort values for controlling the ADV. The LQR module 341 control effort output and the Augmented Control module 342 control effort output are summed and output to control system 306 for controlling the ADV driving. Linear quadratic regulators (LQR) are known in the art, and are not further described herein.

The augmented control is derived from a Fourier Transform, in the frequency domain, of an error signal error, s, obtained from a sequence of cumulative errors of the control of the ADV taken at time increments, i, i+1, . . . n, for a positive integer n. From the viewpoint of the control theory, the augmented control is essentially a Lead-Lag controller, in which the control gains are assigned with specific emphasis in the targeted frequency range. Augmented ("aug") control 342 is described as follows:

$$aug(s) = \frac{\beta(\tau s + 1)}{\alpha \tau s + 1},$$

wherein α, β, and σ, are constants used to tune the shape of the aug(s) controller. The output of aug(s) is in the time domain. In the low frequency of s, e.g. 0 to 1 Hz, the control gain will be large. In the high frequency of s, e.g. 100 Hz, the control gain will low. The aug(s) controller aids the LQR to produce the correct output. Total feedback control action, output to control the ADV, is LQR+aug(s).

Figure 4:
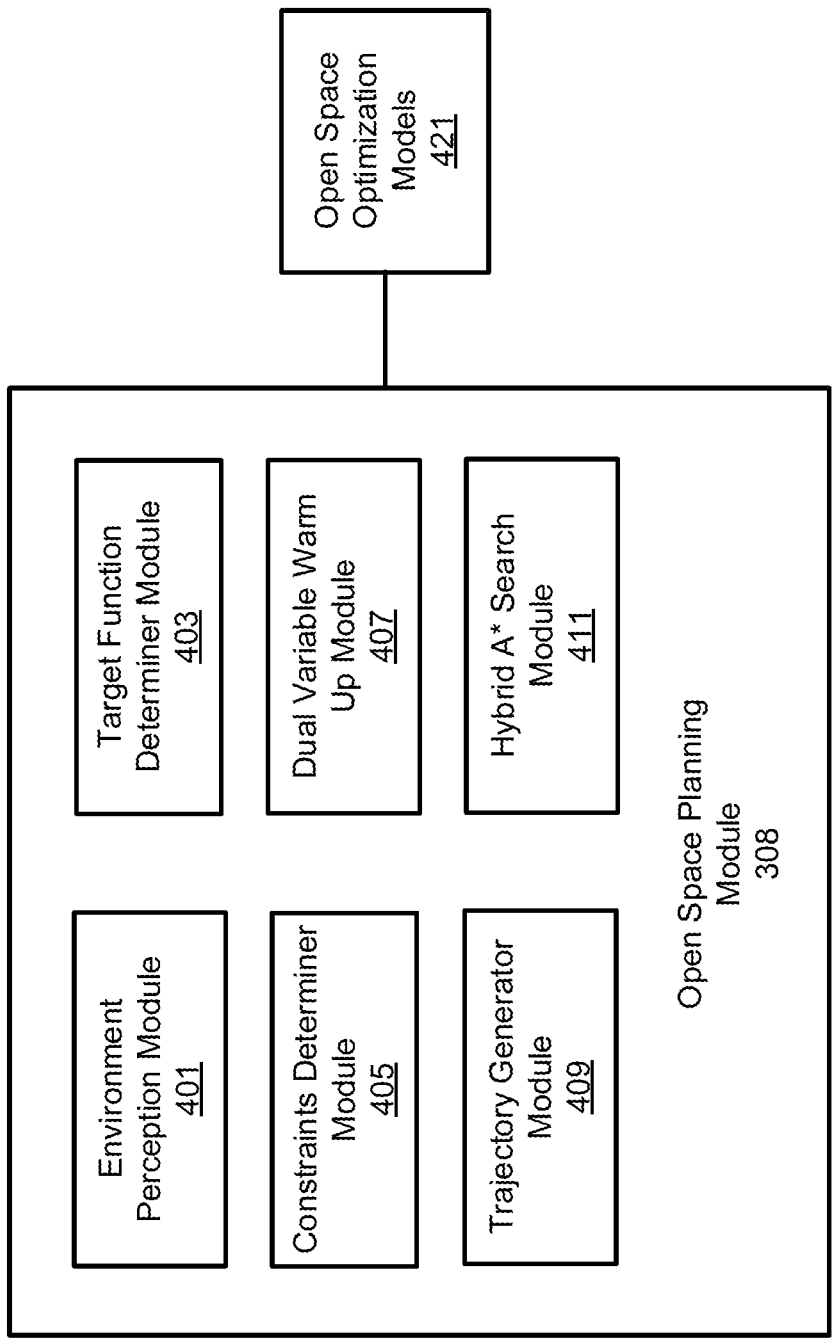
FIG. 4 is a block diagram illustrating architecture of an autonomous driving system according to one embodiment.

FIG. 4 is a block diagram illustrating an example of an open space planning module 308 according to one embodiment. Open space planning module 308 can generate a trajectory for an ADV in an open space, where there is no reference lines or traffic lanes to be followed. Examples of an open space include a parking lot, or a roadway where a vehicle performs a parallel parking, a U-turn, or a three-point turn. Referring to FIG. 4, in one embodiment, open space planning module 308 includes environment perception module 401, target function determiner module 403, constraints determiner module 405, dual variable warming up module 407, trajectory generator module 409, and hybrid A* search module 411. Environment perception module 401 can perceives an environment of the ADV. Target function determiner module 403 can determine a target function for an optimization model (e.g., open space optimization model 421 (as part of models 313 of FIG. 3A)) to optimize. Constraints determiner module 405 can determine constraints for the optimization model. Constraints can include inequality, equality, and bound constraints. Dual variable warming up module 407 can apply a quadratic programming (QP) solver to a target (objective) function to solve for one or more variables (such as dual/two variables) subject to some constraints, where the target function is a quadratic function. Trajectory generator module 409 can generate a trajectory based on the solved variables. Hybrid A* search module 411 can search for an initial trajectory (zig zag, non-smooth trajectory without consideration for observed obstacles) using a search algorithm, such as an A* search algorithm, or a hybrid A* search algorithm.

Figure 5A:
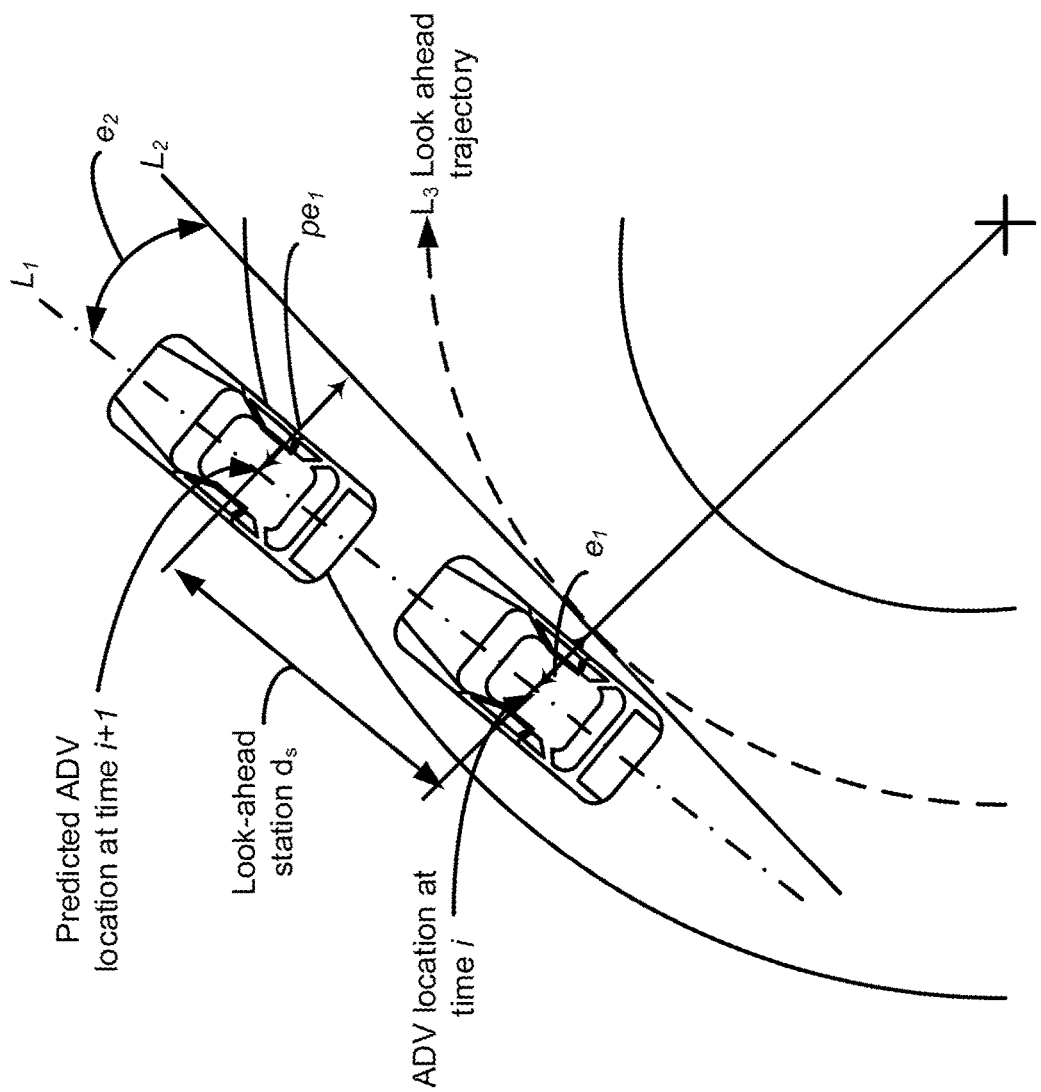
FIGS. 5A and 5B are block diagrams illustrating an example of a predicting a lateral error and heading error in forward driving (FIG. 5A) and reverse driving (FIG. 5B) scenarios, according to one embodiment.
Figure 5B:
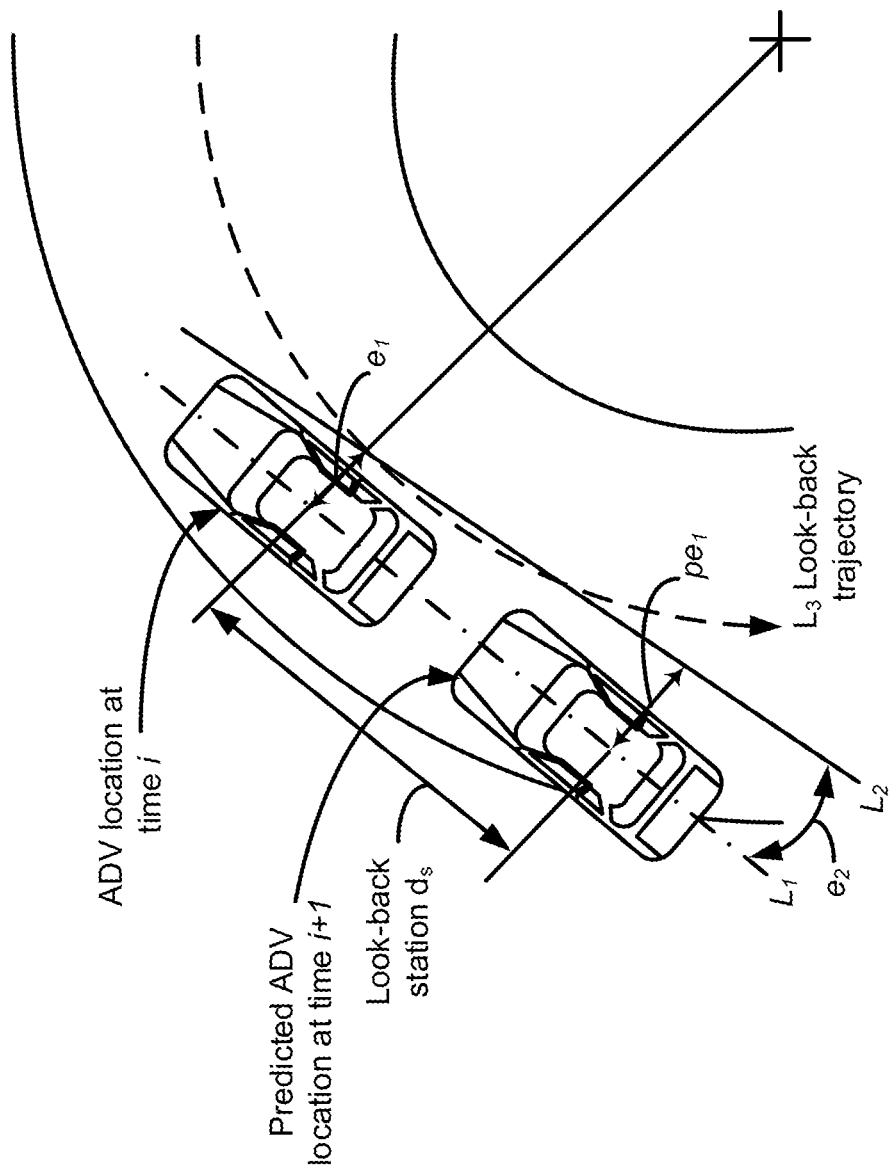

FIGS. 5A and 5B are block diagrams illustrating an example of a predicting a lateral error and heading error in forward driving (FIG. 5A) and reverse driving (FIG. 5B) scenarios, according to one embodiment.

Referring now to FIG. 5A, an autonomous driving vehicle (ADV) is driving in a forward driving gear position. $L_1$ refers to a trajectory line that indicates a predicted direction that the ADV would travel given a current state of ADV control, u(i), at time i. $L_2$ represents at target line for the ADV to follow, given the current planned "look-ahead" trajectory line $L_3$. As shown in FIG. 5A, the ADV is not currently adhering to the look-ahead trajectory $L_3$. At the current time, i, the ADV has a lateral error indicated by $e_1$ and a heading error indicated by $e_2$: $e_2$ is the rotational difference between lines $L_1$ and $L_2$. At time i+1, the ADV is predicted to be at a look-ahead station (location) $d_s$, and to have a predicted lateral error of $pe_1$. Additional control effort will be required to overcome the predicted error and get the ADV back onto the look-ahead trajectory line $L_3$. Such additional effort is determined as described above, with reference to FIG. 3C.

Referring now to FIG. 5B, an autonomous driving vehicle (ADV) is driving in a reverse driving gear position. $L_1$ refers to a trajectory line that indicates a predicted direction that the ADV would travel given a current state of ADV control, u(i), at time i. $L_2$ represents at target line for the ADV to follow, given the current planned "look-back" trajectory line $L_3$. As shown in FIG. 5B, the ADV is not currently adhering to the look-back trajectory $L_3$. At the current time, i, the ADV has a lateral error indicated by $e_1$ and a heading error indicated by $e_2$: $e_2$ is the rotational difference between lines $L_1$ and $L_2$. At time i+1, the ADV is predicted to be at a look-back station (location) $d_s$, and to have a predicted lateral error of $pe_1$. Additional control effort will be required to overcome the predicted error and get the ADV back onto the look-ahead trajectory line $L_3$. Such additional effort is determined as described above, with reference to FIG. 3C.

Figure 6:
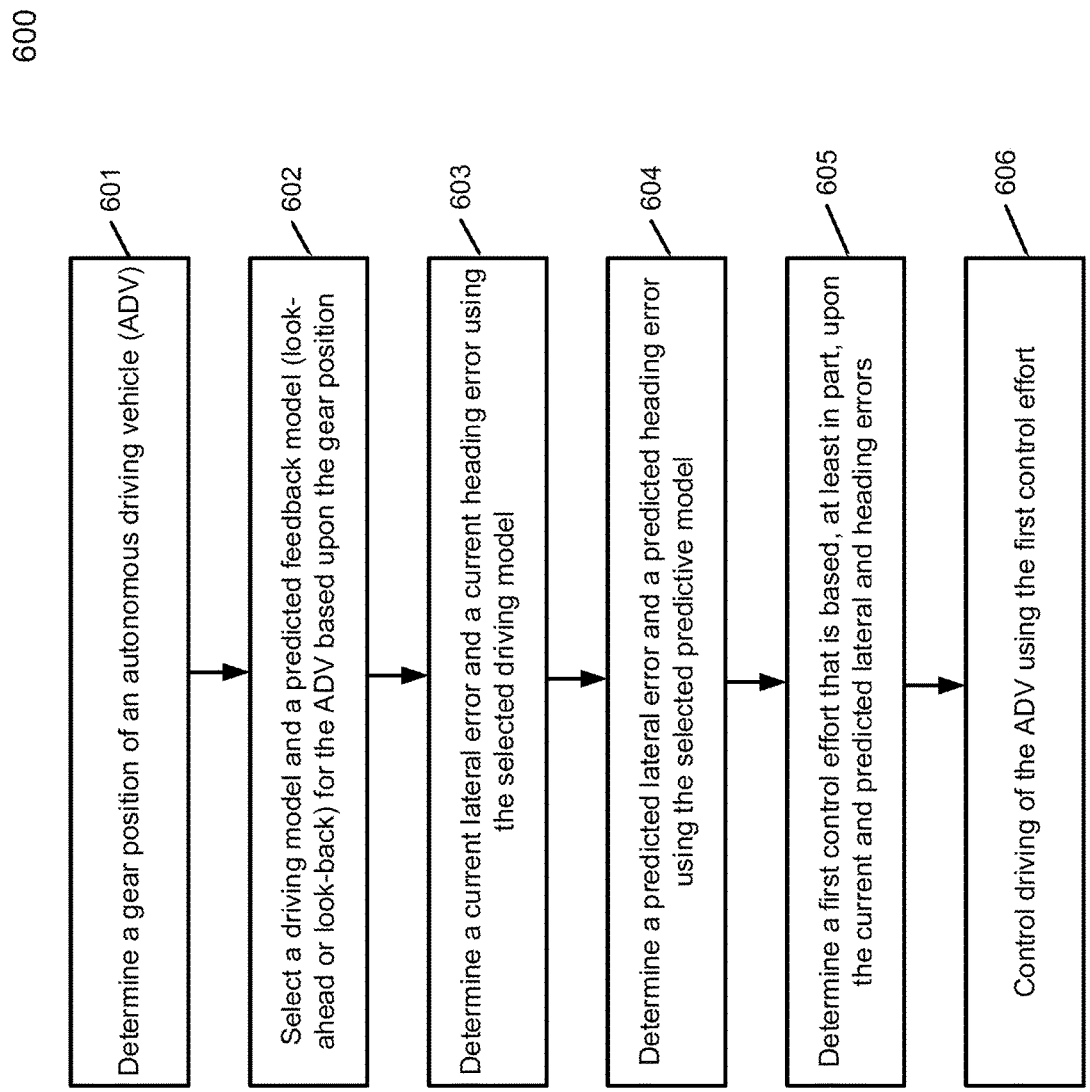
FIG. 6 illustrates a method of controlling an autonomous driving vehicle, according to one embodiment.

FIG. 6 illustrates a method 600 of controlling an autonomous driving vehicle, according to one embodiment.

In operation 601, a gear positions module 321 of a model switching module 320 can determine a current driving gear position of the ADV. The current driving gear position can be a forward driving gear or a reverse driving gear. The driving gear position can be used to select driving models and error models for the current driving gear position.

In operation 602, model switching module 320 selects a forward or reverse driving model, according to the current driving gear position. Look-ahead feedback module 330 can determine a look-ahead, or look-back lateral error routine 331 and a look-ahead or look-back heading error routine 332, based upon the current driving gear position.

In operation 603, the selected driving model (forward model 322 or reverse model 323) can determine the lateral error and heading error of the ADV.

In operation 604, the selected lateral error module 331 and selected heading error module 332 of the look-ahead feedback module 330 can determine a predicted lateral error and a predicted heading (rotational) error.

In operation 605, an LQR module can determine a first control effort, based upon the lateral error and heading error determined by the driving model (322 or 323) and the predicted lateral error 331 and predicted heading error 332 determined by look-ahead feedback module 330. In an embodiment, a second augmented feedback control amount can be added to the LQR module first control effort to generate a cumulative control amount for controlling the ADV.

In operation 606, the ADV can be controlled using the control effort determined in operation 605.

Figure 7:
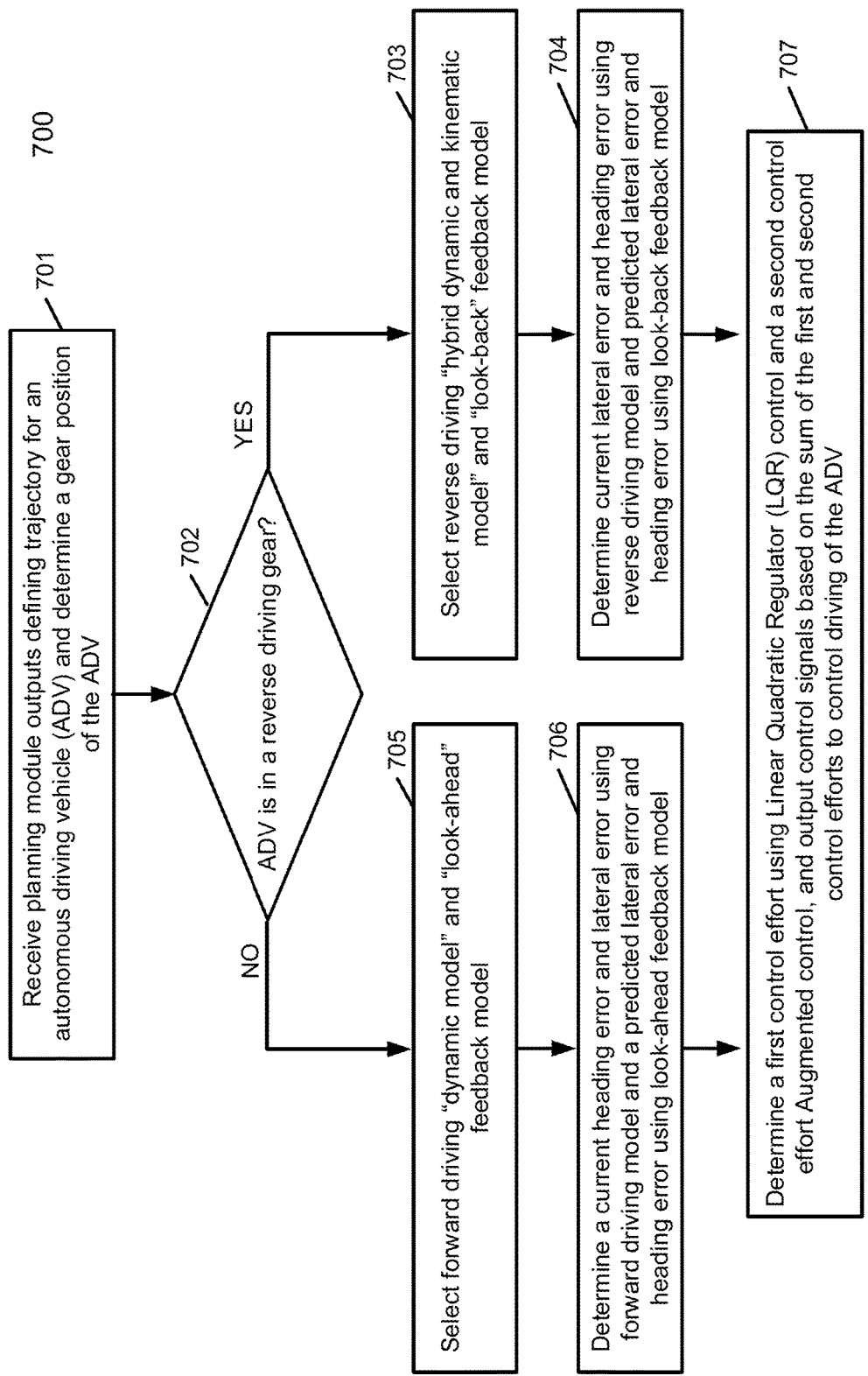
FIG. 7 illustrates a method of controlling an autonomous driving vehicle, according to one embodiment.

FIG. 7 illustrates a method 700 of controlling an autonomous driving vehicle, according to one embodiment.

In operation 701, a planning module can generate outputs that define a trajectory for an ADV. A model switching module 320 of a control system 306 of the ADV can determine a current driving gear position of the ADV. The current driving gear can be forward driving gear or a reverse driving gear.

In operation 702, it can be determined whether the current driving gear is a reverse driving gear. If so, then method 700 continues at operation 703, otherwise method 700 continues at operation 705.

In operation 703, the current driving gear is a reverse driving gear, and model switching module 320 can select a hybrid dynamic and kinematic model determining as a reverse driving model, and select a "look-back" model for the look-ahead feedback 330.

In operation 704, the reverse driving, hybrid dynamic and kinematic model 323, can determine a current lateral error and current heading error of the ADV. The look-back feedback model can determine a predicted lateral error (331) and predicted heading error (332). Method 700 continues at operation 707.

In operation 705, the current driving gear is a forward driving gear, and model switching module 320 can select a 4th order dynamic model as a forward model 322, and select a "look-ahead" model for the look-ahead feedback 330.

In operation 706, the forward driving model can determine a current lateral error and a current heading error of the ADV. The look-ahead model can determine a predicted lateral error and a predicted heading error of the ADV for the look-ahead feedback 330.

In operation 307, a linear quadratic regulator (LQR) can determine a first control effort for controlling the ADV. The output of the LQR is based upon the current and predicted lateral and heading errors determined above. In addition, an augmented control effort can be determined using a Fourier Transform, in the frequency domain, of an error signal determined from a sequence of lateral and heading errors at times i, i+1, . . . n. The augmented control effort, which is determined in the frequency domain, can be output as an augmented control effort in the time domain. The total control effort that is output to the control module 306 for controlling the ADV driving is the sum of the LQR control effort and the augmented control effort.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
selecting a driving model and a predictive feedback model for the ADV based upon a gear position of the ADV, wherein the selected driving model in a forward gear differs from the selected driving model in a reverse gear, and the selected predictive model in the forward gear differs from the selected predictive model in the reverse gear, wherein, for a reverse-driving gear position, the selected driving model comprises a hybrid dynamic and kinematic model, wherein the hybrid dynamic and kinematic model comprises a dynamic model of the driving model in the forward gear with a portion of the dynamic model being replaced with a kinematic model;
determining a current lateral error and a current heading error of the ADV using the selected driving model;
determining a predicted lateral error and a predicted heading error of the ADV using the selected predictive feedback model;
determining a first control effort that is based, at least in part, upon the current and predicted lateral errors and current and predicted heading errors; and
controlling driving of the ADV using the first control effort.

2. The method of claim 1, wherein the gear position comprises one of a forward-driving gear position or the reverse-driving gear position.

3. The method of claim 1, wherein, for a forward-driving gear position, the selected driving model is a dynamic model and the selected predictive feedback model is a look-ahead model.

4. The method of claim 1, wherein the selected predictive feedback model is a look-back model.

5. The method of claim 1, wherein the first control effort is determined by a linear quadratic regular control using the current and predicted lateral errors and heading errors.

6. The method of claim 5, wherein the first control effort is further based upon an augmented control that provides additional lateral error feedback.

7. The method of claim 6, wherein the augmented control is determined by a Fourier Transform analysis of a lateral error signal of the ADV or a heading error signal of the ADV, or both.

8. A non-transitory machine-readable medium having instructions stored therein, which when executed by a processor, cause the processor to perform operations of operating an autonomous driving vehicle (ADV), the operations comprising:
selecting a driving model and a predictive feedback model for the ADV based upon a gear position of the ADV, wherein the selected driving model in a forward gear differs from the selected driving model in a reverse gear, and the selected predictive model in the forward gear differs from the selected predictive model in the reverse gear, wherein, for a reverse-driving gear position, the selected driving model comprises a hybrid dynamic and kinematic model, wherein the hybrid dynamic and kinematic model comprises a dynamic model of the driving model in the forward gear with a portion of the dynamic model being replaced with a kinematic model;
determining a current lateral error and a current heading error of the ADV using the selected driving model;
determining a predicted lateral error and a predicted heading error of the ADV using the selected predictive feedback model;
determining a first control effort that is based, at least in part, upon the current and predicted lateral errors and current and predicted heading errors; and
controlling driving of the ADV using the first control effort.

9. The medium of claim 8, wherein the gear position comprises one of a forward-driving gear position or the reverse-driving gear position.

10. The medium of claim 8, wherein, for a forward-driving gear position, the selected driving model is a dynamic model and the selected predictive feedback model is a look-ahead model.

11. The medium of claim 8, wherein the selected predictive feedback model is a look-back model.

12. The medium of claim 8, wherein the first control effort is determined by a linear quadratic regular control using the current and predicted lateral errors and heading errors.

13. The medium of claim 12, wherein the first control effort is further based upon an augmented control that provides additional lateral error feedback.

14. The medium of claim 13, wherein the augmented control is determined by a Fourier Transform analysis of a lateral error signal of the ADV or a heading error signal of the ADV, or both.

15. A data processing system, comprising:
a processor; and
a memory coupled to the processor to store instructions, which when executed by the processor, cause the processor to perform operations of operating an autonomous driving vehicle (ADV), the operations including
selecting a driving model and a predictive feedback model for the ADV based upon a gear position of the ADV, wherein the selected driving model in a forward gear differs from the selected driving model in a reverse gear, and the selected predictive model in the forward gear differs from the selected predictive model in the reverse gear, wherein, for a reverse-driving gear position, the selected driving model comprises a hybrid dynamic and kinematic model, wherein the hybrid dynamic and kinematic model comprises a dynamic model of the driving model in the forward gear with a portion of the dynamic model being replaced with a kinematic model;
determining a current lateral error and a current heading error of the ADV using the selected driving model;
determining a predicted lateral error and a predicted heading error of the ADV using the selected predictive feedback model;
determining a first control effort that is based, at least in part, upon the current and predicted lateral errors and current and predicted heading errors; and
controlling driving of the ADV using the first control effort.

16. The system of claim 15, wherein the gear position comprises one of a forward-driving gear position or the reverse-driving gear position.

17. The system of claim 15, wherein, for a forward-driving gear position, the selected driving model is a dynamic model and the selected predictive feedback model is a look-ahead model.

18. The system of claim 15, wherein the selected predictive feedback model is a look-back model.

19. The system of claim 15, wherein the first control effort is determined by a linear quadratic regular control using the current and predicted lateral errors and heading errors.

20. The system of claim 19, wherein the first control effort is further based upon an augmented control that provides additional lateral error feedback.

21. The system of claim 20, wherein the augmented control is determined by a Fourier Transform analysis of a lateral error signal of the ADV or a heading error signal of the ADV, or both.

* * * * *